United States Patent Office 2,825,364
Patented Mar. 4, 1958

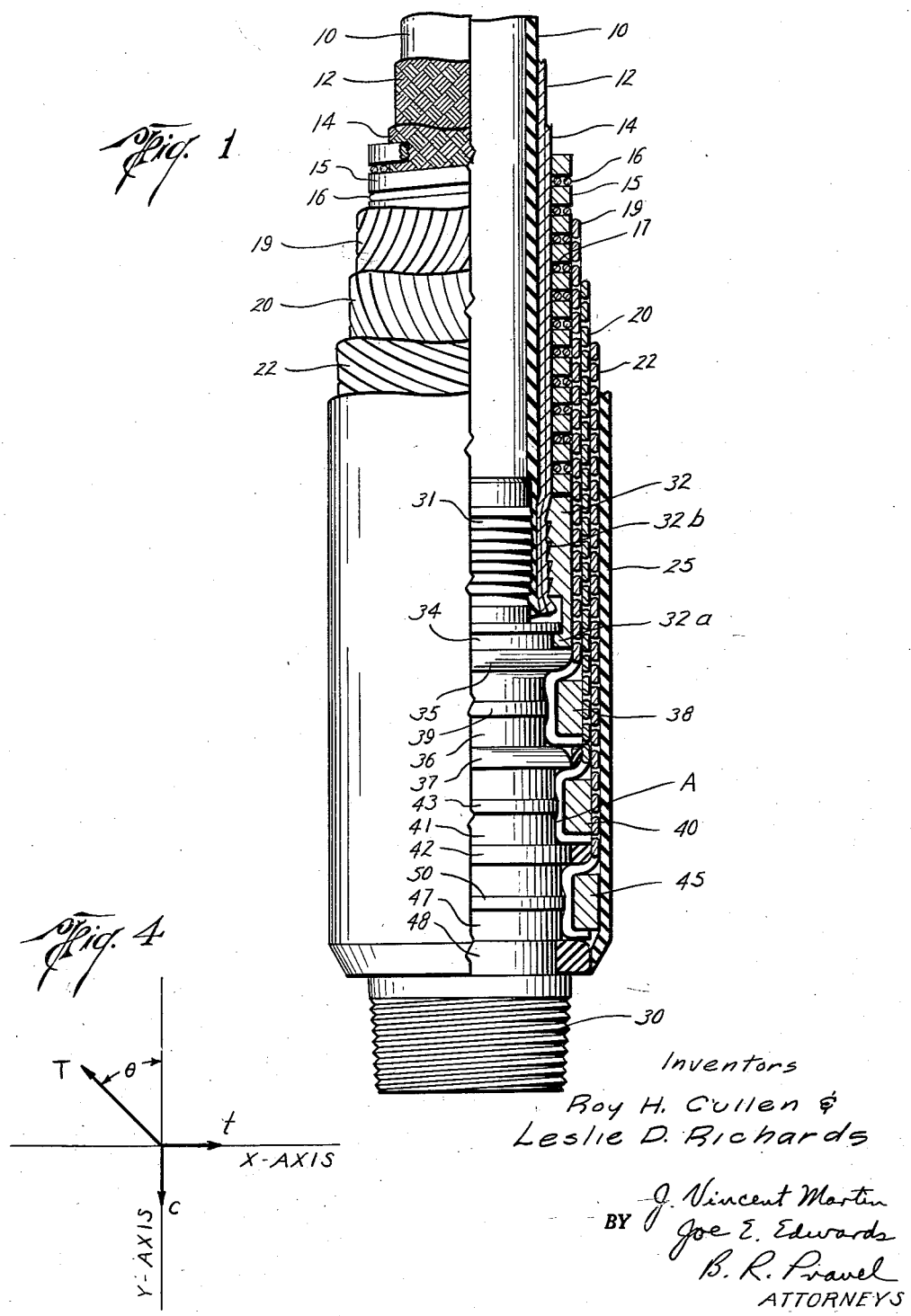

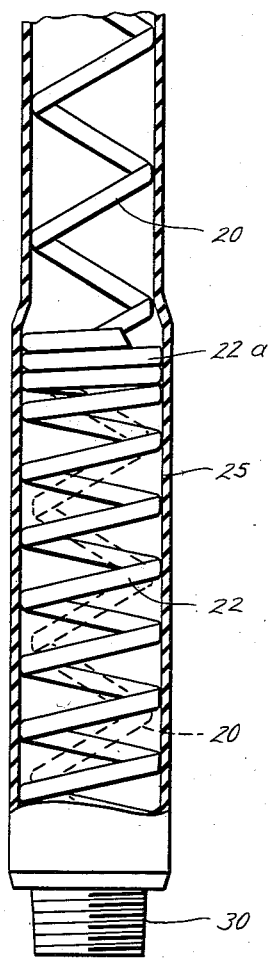
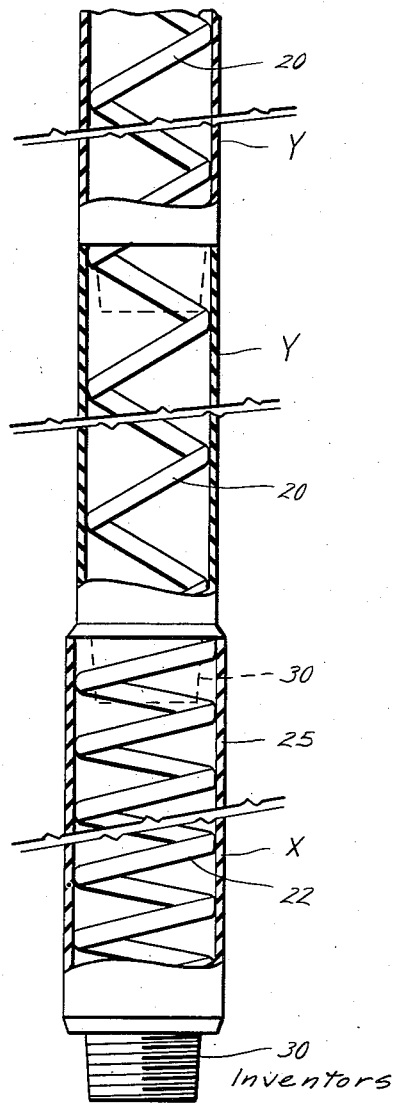

2,825,364

FLEXIBLE SUPPORTS FOR FLUID-DRIVEN DRILL BITS

Roy H. Cullen and Leslie D. Richards, Houston, Tex.; said Richards assignor to said Cullen Application October 14, 1954, Serial No. 462,159

11 Claims. (Cl. 138—56)

This invention relates to new and useful improvements in flexible supports for fluid-driven drill bits.

In the past, it has been proposed to drill a well, such as an oil well or a water well, by suspending a drill bit on a flexible support or hose from the surface of the well. The drill bit is rotated by a turbine which is driven by fluid supplied thereto through the support. The main advantage in the use of the flexible support is that it avoids the necessity for coupling and uncoupling lengths of the usual rigid steel drill pipe, with the consequent elimination of the expense and time involved in such coupling and uncoupling of the usual drill pipe. Despite the evident advantages of using a flexible support instead of the usual drill pipe, the drill pipe continues to be used in practice today, and it is believed that one of the main reasons for the continued use of the rigid drill pipe lies in the fact that the previously known hoses or flexible supports for drill bits are incapable of resisting the torque which is developed during the drilling with the bit, which torque often results in a twisting and subsequent shearing or other damage to the hose or support.

An object of this invention is to provide a new and improved flexible support for a fluid-driven drill bit wherein means are incorporated in the support for resisting the torque force imparted to the support during the rotation of the drill bit for the drilling of a well or similar hole.

An important object of this invention is to provide a new and improved flexible support for a fluid-driven drill bit, wherein the support includes one wire which is helically wound to primarily resist end pull on the flexible support and wherein a second wire is also helically wound for primarily resisting the torque force transmitted to the support during the rotation of the drill bit, such second wire being wound at an angle substantially greater with respect to the longitudinal axis of the support than the first wire.

Another object of this invention is to provide an improved hose for supporting a drill bit wherein said hose is adapted to conduct fluid to a turbine on the support for actuating the drill bit, wherein said hose includes a wire extending substantially the entire length of the hose, and a second wire disposed around the lower portion of the first wire for resisting torque forces imparted to the hose during the drilling of the bit, said hose being suspended at the surface of the well and having a downward force applied thereto by a weight at the lower end of the hose to maintain the wires under tension for counteracting the torque force imparted to the hose by the rotating drill bit.

A further object of this invention is to provide an improved hose for supporting a fluid-driven drill bit, wherein said hose is formed of a plurality of hose sections which are detachably connected together, with one of said sections having a wire wound therein at a relatively steep angle to primarily resist end pull, and wherein another of said hose sections has a wire wound therein at a relatively flat angle to primarily resist the torque force imparted to the hose during the drilling with the drill bit.

The construction designed to carry out the invention will be hereinafter described together with other features thereof.

The invention will be more readily understood from a reading of the following specification and by reference to the accompanying drawings forming a part thereof, wherein an example of the invention is shown, and wherein:

Figure 1 is a view, partly in elevation and partly in section, illustrating a typical construction of the hose or flexible support of this invention.

Figure 2 is a view, partly in elevation and partly in section, illustrating diagrammatically one form of the hose or flexible support of this invention.

Figure 3 is a view, partly in elevation and partly in section, illustrating diagrammatically a second form of the hose or flexible support construction wherein a plurality of hose sections are connected together.

Figure 4 is a vector diagram, illustrating the mathematical relationship of the forces involved in the use of the hose or flexible support construction of this invention.

In the drawings, the numeral 10 designates the inner tube or fluid conductor which is formed of rubber or any similar elastic material. Reinforcing fabric or similar reinforcing layers (not shown) can, of course, be incorporated in the rubber or other material forming the tube 10. In order to provide for burst strength, the inner tube or flow conductor 10 is surrounded by a two-ply wire braid which includes the wire braid layers 12 and 14, which are of conventional construction. A coil spring 15 surrounds the wire braid layers 12 and 14 and such spring 15 is formed of metal and is wound in a right-hand direction, with filler cords 16 and 17 laid between the layers making up the coil 15. The coil 15 is primarily for the purpose of preventing crushing or collapsing of the inner flow conductor or tube 10 when the flexible support or hose of this invention is used in connection with drilling operations for supporting a drill bit. For example, in supporting a drill bit with the hose or support of this invention, the hose or support is ordinarily wound around a drum at the surface of the well and there is a tendency for the hose to collapse or flatten by reason of such winding on the drum. However, the coil spring 15 is of sufficient rigidity to prevent such collapse or flattening.

The coil spring 15 is surrounded by a plurality of helically wound wires 19 which extend in a right-hand direction and which are provided for end pull strength. Such wires 19 are wound at an angle of about 30° with respect to the vertical axis or the longitudinal axis of the hose, as this angle has been found to be about the most satisfactory. The more nearly the angle of the wires 19 approach the vertical axis, the more end pull strength is provided but flexibility is sacrificed, so with the wires at about 30° with respect to the vertical axis, the wires 19 have about the optimum combination of these characteristics.

A plurality of wires 20 which are wound in a left-hand direction surround the wires 19 and extend at about 30° or more specifically an angle of about 28° with respect to the vertical axis, in the opposite direction from the wires 19. The wires 20 provide for end pull strength, but they also provide for torque resistance, as will be more evident hereinafter. Although the wires 20 may be wound at different angles than the above suggested angle of about 28°, it has been found that such angle is about the most desirable that can be obtained for providing the combination of characteristics, namely, end pull strength, flexibility, and torque resistance.

A plurality of wires 22 are wrapped around the wires 20 and are wound in a left-hand direction at an angle of approximately 80° or, more specifically at an angle of about 78°. This group of wires 22 are primarily for resisting torque forces acting on the hose or flexible support and actually such wires 22 provide very little end pull strength. As will be explained more in detail hereinafter, although the maximum torque strength of the hose is obtained when the wires 22 are wrapped at an angle of 45°, it has been found that the hose can be prevented from twisting by suspending less weight therefrom when the angle of the wires 22 is greater with respect to the vertical or longitudinal axis of the hose than the maximum torque angle of 45°. The particular angle of about 78° is considered to be the optimum angle for both the weight factor and the torque strength factor.

It should be pointed out that although the wires 20 and 22 tend to collapse as the torque force is applied thereto during drilling, such collapse or flattening is prevented by the coil spring 15 whereby the tube 10 is also prevented from being collapsed.

An outer sheath or covering 25 surrounds the outer layers of wire 22 and completely encloses all of the various layers which form the hose or flexible support of this invention (Figure 1) to thereby prevent well fluids and the like from causing corrosion or other damaging action on the various layers. Such sheath or cover 25 is preferably formed of rubber or other resilient and non-corrosive material.

The hose of this invention may be formed in a continuous length or may be formed in a plurality of sections which are connected together, but in any event coupling members are located at each end of the hose or the hose sections. In Figure 1, a preferred coupling or connecting member is illustrated and is designated by the letter A, such coupling member A being illustrated with a threaded pin 30, although it will be understood that the other end of the hose or hose section will have a threaded box (not shown) as part of the coupling member rather than the threaded pin whereby the hose sections can be connected together to form the complete length of hose, or other parts of the drilling equipment can be connected thereto.

The coupling member A is of course formed with an internal bore or passage therethrough so that fluid flows through the coupling A and through the fluid conductor or tube 10. The inner end of the coupling member A is provided with a reduced diameter portion having buttress type teeth 31 formed on an external surface thereof. A clamping ring 32 surrounds the buttress teeth 31 and such ring 32 is provided with an inwardly radially extending annular flange 32a which fits into a circumferential groove 34 in the member A to thereby retain the ring 32 against longitudinal movement relative to the coupling member A. The internal surface of the ring 32 is formed with buttress teeth 32b so that upon a compression of the ring 26, with the layers 10, 12 and 14 between the teeth 32b and the teeth 31, the layers 10, 12 and 14 are compressed and confined against longitudinal movement between the ring 32 and the buttress teeth 31. The ring 32 can, of course, be of any conventional type which is adapted to be compressed for applying a clamping action to the layers 10, 12 and 14 but preferably the ring 32 is a solid ring which is formed of a material which retains itself in a compressed condition. The ring 32 would, of course, be applied in its clamped position prior to the addition of the layers 19, 20, 22 and 25.

For clamping the layer 19 on the coupling member A, the ends of the wires 19 extend over an annular radial flange 35 and into an annular groove 36 formed between said flange 35 and another flange 37. Such groove 36 has an annular ridge 39 formed therein in substantially the center portion thereof, whereby a clamping ring 38 is positioned over the ends of the wires 19 to apply a compressive force to the wires 19 to maintain same tightly within the groove 36. The ridge 39 assists in deforming the wires 19 to improve the retaining hold with respect to the connecting member or coupling A. The ring 38 is preferably a solid ring which retains its compressed condition to clamp the ends of the wires 19 between the flanges 35 and 37. Such positioning of the clamping ring 38 is preferably accomplished prior to the addition of the wires 20 and 22 and the outer sheath 25.

The wires 20 are retained against longitudinal movement by a clamping ring 40 which is substantially the same as clamping ring 38 and which acts to apply a compressive force to the ends of the wires 20 to maintain same deformed within an annular groove 41 positioned between the flanges 37 and 42 formed on the coupling member A. A central annular ridge 43 is provided similar to the ridge 39 and accomplishes the same purpose of deforming the ends of the wires to improve the holding effect of the clamp ring 40.

The outer wires 22 are held on the connecting member A in a similar manner by a clamping ring 45 which is of the solid ring type and which is compressible to maintain the ends of the wires 22 in the annular groove 47 disposed between the annular radial flange 42 and the annular radial flange 48. A central rib 50 similar to the ribs 39 and 43 is also provided for the same purpose as the ribs 39 and 43.

The outer sheath or cover 25 is applied last and is bonded to the annular flange 48 with any suitable type of adhesive or bonding material so that a fluid tight connection is made therebetween. Thus, with the construction disclosed in Figure 1, all of the layers are firmly connected to the coupling or connecting member A and are thereby retained against longitudinal movement relative to such connecting member A, with the sheath 25 protecting the various layers from the corrosive action of fluids externally of the hose and the inner tube or fluid conductor 10 preventing the other layers from corrosion or other undesirable action by reason of corrosive fluid or the like within the conductor 10. As previously mentioned, the other end of the hose or hose section will have the same type of coupling member A, but the threaded pin 30 will be replaced with a threaded box which is complementary to the threaded pin 30. Also, it will be evident that other types of connecting means or couplings can be utilized so long as the various layers of the hose are retained against longitudinal movement at the ends thereof.

The primary use for the hose of this invention is as a flexible support for a fluid-driven drill bit (not shown) which is attached to the lower end of the hose. As previously explained, the supporting of a drill bit which is fluid driven has been proposed in the past and with such arrangement a fluid turbine is connected above the drill bit and the fluid supplied through the flexible support drives the turbine for effecting a rotation of the drill bit. Suitable weights such as conventional drill collars or even special flexible drill collars may be interposed between the flexible hose and the turbine in order to apply adequate weight to the drill bit for drilling a well. Also, as will be explained, this invention contemplates using weights such as drill collars for maintaining the hose under tension so that the wires 20 and 22 provide adequate torque resistance to prevent twisting or kinking of the hose.

Thus, in using the hose of this invention as the flexible support for a drill bit, and a fluid turbine and such other equipment as is normally used in a drilling operation, the weight which is disposed at the lower end of the hose is of particular importance because such weight is utilized to maintain the wires 20 and 22 of the hose under tension. In other words, the hose is suspended from the surface of the well and the weights which are disposed at the lower end of the hose apply a downward force to the hose to place said wires under tension. The particular construction of the hose or flexible support of this invention is such that the maintaining of the hose under tension by a downward force supplied by the drill collars or other weights prevents twisting or kinking of the hose which might otherwise occur from the torque force imparted to the hose during the rotation of the drill bit for drilling the well or other hose.

The theory of this invention is illustrated in the vector diagram of Figure 4 wherein: $T$=tension in the wires created by torque and end pull; $t$=forces created by torque alone; $C$=end pull or axial force needed to make the summation of forces zero, or in other words, to prevent kinking or twisting of the hose; $\theta$=the angle at which the particular wire or wires are wound with respect to the longitudinal or vertical axis of the hose. By adding the forces in the X and Y directions, the following formula is derived:

$$\Sigma X = C - T \cos \theta = 0$$
$$\Sigma Y = T \sin \theta - t = 0$$
$$\therefore C = t \frac{\cos \theta}{\sin \theta}$$

The above formula is applicable to wires which are wound or laid in an opposite direction to the direction of rotation of the drill bit attached to the hose. Thus, in the present invention, the above formula would be applicable in determining the weight to be applied to the hose when the wires 20 and 22 are considered, both of such series or groups of wires 20 and 22 being laid or wound in a left hand direction whereas the rotation of the drill bit is in a right hand direction.

The above formula makes it evident that as $\theta$ approaches 90°, C becomes smaller and smaller. It is also evident that as $\theta$ approaches 90°, the number of wires in the wrap will become less and less, thereby reducing the torque strength from the maximum which would be available at an angle of 45°. By compromising these various characteristics and factors, the desired torque resistance can be obtained while using a minimum amount of weight to maintain the wires of the hose under tension. Thus, it has been found that the outer wires 22 are preferably at an angle of about 80° with respect to the longitudinal axis of the hose in order to obtain a sufficient number of the wires for adequate strength and to have the smallest amount of drill collars or other weight required to prevent twisting or turning of the hose during the drilling operation. However, it is to be understood that a different angle than 80° may be preferred if either more end strength or more torque strength is required in a particular drilling operation.

The wires 20 are at an angle of about 30° because they are primarily for providing end pull strength, but since they are wound in a direction opposite to the direction of rotation of the drill bit, they also provide a relatively minor amount of torque resistance. The manner in which the wires 20 and 22 are combined can be varied as will be explained in connection with Figures 2 and 3 so that the end pull strength of the wires 20 is combined with the torque resistance of the wires 22, whereby a highly satisfactory flexible support for a drilling bit is provided.

In Figure 2, the hose of Figure 1 is illustrated diagrammatically to show one arrangement wherein the wires 20 and 22 are disposed with respect to each other for preventing twisting or kinking of the hose or flexible support during the drilling operation with a fluid-driven drill bit. The threaded pin 30 is shown at the lower end of the hose in Figure 2 and the wires 20 are shown schematically by a dotted line, while the wires 22 are shown schematically as a single wire in solid lines. The hose illustrated in Figure 2 has an identical construction to that shown in Figure 1 except that the wires 22 do not extend throughout the full length of the hose. Instead, such wires 22 extend for only a relatively short portion of the lower length of the hose and are banded together at their upper ends as indicated by the turns 22a (Figure 2) so that the wires 22 are firmly connected at their upper ends to the wires 20. The connection between the wires 20 and 22 can be made by welding or any other suitable equivalent means rather than by merely banding as indicated at 22a, if so desired. The outer sheath 25 is shown in Figure 2, and it will be understood that the outer layers illustrated in Figure 1 would be included in the construction of Figure 2 to form the complete hose or flexible support of this invention.

The main purpose of the wires 22 is to prevent the torque force from the rotation of the drill bit being transmitted to the hose to thereby prevent twisting or kinking of the hose. The wires 22 are therefore wound at an angle of 45° or more with respect to the longitudinal axis of the hose so that they primarily provide the torque strength in the hose. On the other hand, the wires 20 are wound at an angle less than 45° with respect to the longitudinal axis of the hose so that they are primarily for end pull strength, although they do supply some torque strength. As previously mentioned, the wires 22 are preferably at an angle of about 80° for most cases, whereas the wires 20 are at an angle of about 30°, with both of said wires 20 and 22 being wound in a direction opposite to the direction of rotation of the drill bit.

In Figure 3, the flexible support of this invention is illustrated as being formed of a lower hose section X and upper sections Y. The section X is formed identically with that hose section illustrated in Figure 1 and includes all the layers thereof, but in Figure 3 such section is illustrated diagrammatically with only the outer sheath 25 and the outer wires 22 which are indicated as a single wire. The hose section Y immediately above the section X has its threaded pin 30 extending into a threaded box formed in the upper end of the hose section X, as will be readily understood, and the rest of the hose section Y is identical with the hose construction illustrated in Figure 1 except that the outer wires 22 are eliminated. The sections Y are duplicated so that a sufficient number are provided to extend to the surface of the well. The drill bit and fluid turbine for driving the drill bit are connected below the hose section X with suitable weights such as flexible drill collars disposed therebetween. The hose section X is of sufficient length to provide enough weight to prevent the section or sections Y from kinking; with such arrangement, very little weight is necessary at the lower end of the hose section X as explained in detail hereinafter. In some cases, a plurality of hose sections X are employed at the lower end of the hose, but in any event the total length of the hose section or sections X should be sufficient so that a relatively small number of drill collars or weights suspended from the hose are necessary to prevent twisting of the hose. Since the drill collars are usually relatively rigid as compared to the hose or in the case of flexible drill collars more expensive, it will be evident that the advantages of using a flexible support or hose are reduced as more drill collars are used since such drill collars must be handled like regular rigid drill pipe are, or more expense is involved.

The particular length for wires 22 or sections X may be readily calculated. For example, in drilling a 3¾" hole at about 30 feet per minute through a hard sandstone at a bit R. P. M. of 100, suppose about 3 horsepower is needed. This, of course, amounts to a torque at that particular R. P. M. of 1870 pound inches. If layer 22 is wrapped on at 80° and at a diameter of 3", then the force created by this torque will be about 1250 pounds. The force C or the force necessary to prevent kinking will be 233 pounds from the above given formula; however, if layer 20 were a helix angle of 30°, a force C of 2160 pounds would be required to prevent kinking in section Y. If section X were 8 pounds per foot, then 271' of this section would be required to prevent the upper section Y from kinking. The advantage is in eliminating 1889 pounds of drill collars in suspension by adding the additional 80° helix angle wrap to the lower 271 feet. Thus, the entire length transmits torque from the bit to the surface with very little required end load to prevent kinking.

It should be pointed out that the normal amount of drill collars, flexible or stiff, must be used for weight on the bit to aid drilling. The drill collars referred to above must be held in suspension by the hose. This invention in effect eliminates a large percentage of drill collars required when drilling with a flexible hose and also provides a means for providing a very strong flexible hose in a torque sense as represented by section X.

It is believed evident that the outside 80° helix wrap 22 and middle wrap 20 are wrapped in the same direction and that the inside wrap 19 is wrapped in the opposite direction, so that when torque is not being applied, as in the case of pulling when the hose is stuck, the unraveling effect on layers 20 and 19, which are wrapped at approximately the same helix angle but in opposite directions, will balance. This balance should of course be maintained in multiple layers of the low helix angle wraps in cases where more end pull strength is required. However, a balancing layer in the opposite direction for the high helix angle wrap 22 is not required, since it is primarily designed for torque strength and exhibits comparatively little end pull strength. In other words, the layers 19 and 20 provide end pull strength and 22 provides torque strength for section X. Layers 19 and 20 provide end pull strength for section Y, and layer 20 must also provide torque strength for section Y. The fact that layer 20 in section Y has an additional stress from torque over and above the stress produced by end pull is compensated for to a great extent by its greater diameter since it is wrapped over 19. However, in possible cases where greater amounts of torque must be transmitted, the section Y could be eliminated and a complete drill stem of section X be employed, where the helix angle on the third wrap 22 is maintained at the angle that will give a good safety factor in strength yet require minimum force C, or in other words minimum drill collars in suspension.

It is also possible that in some cases actually no drill collars will be needed in suspension, if the torque load is light enough or the helix angle high enough. A condition of this sort could be encountered when milling a damaged casing or operating bottom hole tools that require small torque loads to set slips and the like.

Although the hose or flexible support of this invention is disclosed above for use in supporting a drill bit, it will be evident that such hose or flexible support has numerous other uses, and that it is particularly suitable for supporting any type of well tools.

The foregoing disclosure and description of the invention is illustrative and explanatory thereof and various changes in the size, shape and materials, as well as in the details of the illustrated construction, may be made within the scope of the appended claims, without departing from the spirit of the invention.

What is claimed is:

1. A flexible hose, including an inner flexible tube for conducting fluid therethrough, a first wire helically disposed around said tube at an angle for primarily resisting end pull on the hose, a second wire helically disposed around said tube in the same helical direction as said first wire and at an angle for primarily resisting torque forces applied to said hose, said second wire being positioned at the lower end of said first wire when said hose is extended substantially vertically, means connecting the upper end of said first wire to said tube, means connecting the upper end of the second wire to the first wire, and means connecting the lower end of said second wire to said tube, whereby said hose has both end pull strength and torque resistance with a reduced amount of weight being required to compensate for a predetermined torque force acting on the hose as compared to the weight required when said second wire is not present.

2. The structure set forth in claim 1, wherein said second wire is disposed at an angle which is more nearly perpendicular to the longitudinal axis of the hose than said first wire.

3. The structure set forth in claim 1, wherein said upper end of said second wire is connected to an intermediate of said first wire.

4. A flexible hose, including an inner flexible tube for conducting fluid therethrough, a first wire helically disposed around said tube at an angle for primarily resisting end pull on the hose, a second wire helically disposed around said tube in the same helical direction as said first wire and at an angle for primarily resisting torque forces applied to said hose, said second wire being positioned at the lower end of said first wire when said hose is extended substantially vertically, the upper end of said first wire being connected to said tube, the upper end of the second wire being connected to the first wire, the lower end of said second wire being connected to said tube, said first wire being helically disposed at an angle less than about 45° with respect to the longitudinal axis of the hose, and said second wire being helically disposed at angle of about 45° or greater with respect to the longitudinal axis of the hose, whereby said hose has both end pull strength and torque resistance with a reduced amount of weight being required to compensate for a predetermined torque force acting on the hose as compared to the weight required when said second wire is not present.

5. A flexible hose, including an inner flexible tube for conducting fluid therethrough, a first wire helically disposed around said tube in the same helical direction as said first wire and at an angle for primarily resisting end pull on the hose, a second wire helically disposed around said tube at an angle for primarily resisting torque forces applied to said hose, said second wire being positioned at the lower end of said first wire when said hose is extended substantially vertically, the upper end of said first wire being connected to said tube, the upper end of the second wire being connected to the first wire, the lower end of said second wire being connected to said tube, said first wire being helically disposed at an angle of about 30° with respect to the longitudinal axis of the hose, and said second wire being helically disposed at an angle of about 80° with respect to the longitudinal axis of the hose, whereby said hose has both end pull strength and torque resistance with a reduced amount of weight being required to compensate for a predetermined torque force acting on the hose as compared to the weight required when said second wire is not present.

6. A flexible hose, including an inner flexible tube for conducting fluid therethrough, a first wire helically disposed around said tube at an angle for primarily resisting end pull on the hose, a second wire helically disposed around said tube in the same helical direction as said first wire and at an angle for primarily resisting torque forces applied to said hose, said second wire being positioned at the lower end of said first wire when said hose is extended substantially vertically, the upper end of said first wire being connected to said tube, the upper end of the second wire being connected to the lower end of said first wire, and the lower end of said second wire being connected to said tube, whereby said hose has both end pull strength and torque resistance with a reduced amount of weight being required to compensate for a predetermined torque force acting on the hose as compared to the weight required when said second wire is not present.

7. A flexible hose, comprising a plurality of hose sections, means releasably connecting said hose sections together, one of said sections having a helically wound wire extending for substantially the length thereof, said wire being wound at a helix angle to primarily resist end pull on the hose, and the other of said sections having a wire wound in the same helical direction and at a greater helix angle than the helix angle of the wire of said one of said sections to provide primarily for torque resistance.

8. In a hose adapted to be lowered into a well bore for suspending a fluid-driven turbine and drill bit therefrom and for supplying driving fluid to said turbine for rotating said bit, a hose section having an inner flexible tube, a first layer of wires surrounding said tube and disposed at a helix angle to primarily provide end pull strength, a second layer of wires surrounding a portion of said first layer of wires and being in the same helical direction and at a greater helix angle than the helix angle of the wires in said first layer to primarily provide torque resistance when a predetermined force is applied to said hose, and a coil spring dispuosed between said flexible tube and said wires to prevent collapse of said hose as said wires are urged to a contracted condition during the application of a torque force thereto.

9. A flexible hose, including an inner flexible tube for conducting fluid therethrough, a first wire helically disposed around said tube at an angle for primarily resisting end pull on the hose, a second wire helically disposed around said tube in the same helical direction as said first wire and at an angle for primarily resisting torque forces applied to said hose, said second wire being positioned at the lower end of said first wire when said hose is extended substantially vertically, the upper end of said first wire being connected to said tube, the upper end of the second wire being connected to the first wire, and the lower end of said second wire being connected to said tube, whereby said hose has both end pull strength and torque resistance with a reduced amount of weight being required to compensate for a predetermined torque force acting on the hose as compared to the weight required when said second wire is not present.

10. In a flexible hose, an inner tubular flexible fluid conductor for conducting fluid therethrough, means forming part of said hose for preventing the twisting of said hose, said means including a helically wound wire in said hose to which a torque force is applied, a support means for said hose connected to the upper end of said wire, and means applying an axial force to the lower end of said wire, the ratio of said axial force to the torque force on said wire being at least equal to the cotangent of the helix angle of said wire, whereby the wire in the hose is suspended with the axial force acting thereon to prevent kinking of the hose.

11. The structure set forth in claim 10, wherein said means applying an axial force to the lower end of said wire includes a drill collar connected to the lower end of said wire.

References Cited in the file of this patent

UNITED STATES PATENTS

| | | |
|---|---|---|
| 1,831,724 | Stokes | Nov. 10, 1931 |
| 1,896,285 | Burd | Feb. 7, 1933 |
| 1,951,723 | Burd et al. | Mar. 20, 1934 |
| 2,133,863 | Knoderer | Oct. 18, 1938 |
| 2,594,617 | Boice | Apr. 29, 1952 |